US008203665B2

(12) United States Patent
Choi

(10) Patent No.: US 8,203,665 B2
(45) Date of Patent: Jun. 19, 2012

(54) BLACKLIGHT UNIT, LIQUID CRYSTAL DISPLAY DEVICE HAVING THE SAME, AND METHOD FOR PROVIDING SUBSTANTIALLY WHITE LIGHT FOR LIQUID CRYSTAL DISPLAY DEVICE

(75) Inventor: Jong-Hyun Choi, Incheon (KR)

(73) Assignee: LG Display Co., Ltd., Seoul (KR)

( * ) Notice: Subject to any disclaimer, the term of this patent is extended or adjusted under 35 U.S.C. 154(b) by 546 days.

(21) Appl. No.: 11/475,942

(22) Filed: Jun. 28, 2006

(65) Prior Publication Data
US 2007/0147081 A1 Jun. 28, 2007

(30) Foreign Application Priority Data
Dec. 26, 2005 (KR) .................. 10-2005-0129995

(51) Int. Cl.
G02F 1/1335 (2006.01)
G09F 13/04 (2006.01)
G09F 13/08 (2006.01)
F21V 7/04 (2006.01)

(52) U.S. Cl. ........... 349/62; 349/68; 362/97.2; 362/612; 362/613

(58) Field of Classification Search .................... 349/62, 349/68; 362/97.1–97.4, 612, 613
See application file for complete search history.

(56) References Cited

U.S. PATENT DOCUMENTS

| 4,948,214 | A  | * | 8/1990 | Hamblen | 359/654 |
|---|---|---|---|---|---|
| 6,439,731 | B1 | * | 8/2002 | Johnson et al. | 362/29 |
| 6,636,363 | B2 | * | 10/2003 | Kaminsky et al. | 359/707 |
| 6,747,710 | B2 | * | 6/2004 | Hall et al. | 349/9 |
| 6,770,498 | B2 | * | 8/2004 | Hsu | 438/26 |
| 7,063,430 | B2 | * | 6/2006 | Greiner | 362/30 |
| 7,144,131 | B2 | * | 12/2006 | Rains | 362/231 |
| 7,322,731 | B2 | * | 1/2008 | Epstein et al. | 362/609 |
| 7,385,653 | B2 | * | 6/2008 | Kim et al. | 349/61 |
| 2002/0071288 | A1 |   | 6/2002 | Lim |  |
| 2003/0052594 | A1 |   | 3/2003 | Matsui et al. |  |
| 2004/0061814 | A1 | * | 4/2004 | Kim et al. | 349/65 |
| 2005/0259195 | A1 |   | 11/2005 | Koganezawa |  |

FOREIGN PATENT DOCUMENTS
CN 1702523 A 11/2005
CN 1821845 A 8/2006
* cited by examiner Primary Examiner — Mark Robinson
Assistant Examiner — Paisley L Arendt
(74) Attorney, Agent, or Firm — Birch, Stewart, Kolasch & Birch, LLP

(57) ABSTRACT

A backlight unit as embodied includes a plurality of unit groups, each unit group having a plurality of light emitting diodes (LEDs); and a light mixing layer formed over the unit groups, for mixing lights emitted from the LEDs to provide substantially white light.

17 Claims, 4 Drawing Sheets

BLACKLIGHT UNIT, LIQUID CRYSTAL DISPLAY DEVICE HAVING THE SAME, AND METHOD FOR PROVIDING SUBSTANTIALLY WHITE LIGHT FOR LIQUID CRYSTAL DISPLAY DEVICE

This Nonprovisional Application claims priority under 35 U.S.C. §119(a) on Patent Application No. 10-2005-0129995 filed in Korea on Dec. 26, 2005, the entire contents of which are hereby incorporated by reference.

BACKGROUND OF THE INVENTION

1. Field of the Invention

The present invention relates to a backlight unit and a liquid crystal display (LCD) device, and more particularly, to a backlight unit capable of enhancing color uniformity, an LCD device having the same, and a method for providing substantially white light for a liquid crystal display device.

2. Description of the Background Art

Generally, a liquid crystal display (LCD) device comprises a liquid crystal display (LCD) panel having a thin film transistor (TFT) array substrate, a color filter substrate facing the TFT array substrate, and a liquid crystal layer interposed between the two substrates; a driving unit for driving the LCD panel; and a backlight unit for supplying light to the LCD panel.

On the TFT array substrate, a plurality of data lines and a plurality of gate lines arranged in a horizontal direction cross each other to define pixels. The pixels are arranged as a matrix form.

On the color filter substrate, R, G, and B color filter layers are arranged at positions corresponding to the pixels. A black matrix for preventing light from being leaked between the color filter layers and for preventing color interference of light that passes through the pixels is formed on the color filter substrate.

A common electrode and a pixel electrode are respectively formed at inner surfaces of the color filter substrate and the TFT array substrate facing each other, thereby applying an electric field to the liquid crystal layer. The pixel electrode is formed on the TFT array substrate at a position corresponding to each pixel. The common electrode is integrally formed on an entire surface of the color filter substrate. Therefore, a voltage to be applied to the pixel electrode is controlled under a state that a voltage has been applied to the common electrode, thereby changing an alignment state of liquid crystal molecules of the liquid crystal layer and thus individually controlling an optical transmittance of each of the pixels.

The backlight unit supplies light to the LCD device that does not spontaneously emit light. When the light emitted from the backlight unit passes through the liquid crystal layer, an optical transmittance is determined by the alignment state of the liquid crystal molecules and thus an image is displayed.

The backlight unit is divided into an edge type and a direct type according to a position of a lamp to be used as an optical source.

In the edge type backlight unit, a lamp is positioned at one side surface or two side surfaces of an LCD panel, and the light emitted from the lamp is transmitted to an entire surface of the LCD panel by a light guiding plate.

The direct type backlight unit has been developed since a size of the LCD panel is increased to be more than 20 inches. In the direct type backlight unit, a plurality of fluorescent lamps are arranged at a lower surface of a diffusion plate in series thereby to directly irradiate the light to an entire surface of the LCD panel. The direct type backlight unit provides higher optical efficiency than the edge type backlight unit, thereby being mainly used to an LCD device of a large screen requiring higher brightness.

A cold cathode fluorescent lamp (CCFL), a hot cathode fluorescent lamp (HCFL), an electro-luminescence (EL) lamp, a light emitting diode (LED), etc. are used as an optical source. Among the optical sources, the CCFL and the LED are mainly used.

The CCFL provides high brightness and enhances brightness uniformity. However, the CCFL cannot provide a partial brightness control and an original color reproduction.

In the LED, R, G, and B LEDs are arranged in a stripe form thereby to provide a partial brightness control and an original color reproduction. However, the LED has inferior color uniformity to the CCFL. That is, since the LED emits white light by mixing R, G, and B light emitted from the R, G, and B LEDs, a pure white image can not be displayed and uneven brightness is caused when the R, G, B colors are not uniformly mixed together.

BRIEF DESCRIPTION OF THE INVENTION

Therefore, an object of the present invention is to provide a backlight unit capable of enhancing color uniformity, a liquid crystal display (LCD) device having the same, and a method for providing substantially white light for a liquid crystal display device.

Another object of the present invention is to provide a backlight unit capable of enhancing brightness uniformity, a liquid crystal display (LCD) device having the same, and a method for providing substantially white light for a liquid crystal display device.

To achieve these and other advantages and in accordance with the purpose of the present invention, as embodied and broadly described herein, there is provided a backlight unit, comprising: an optical source including a plurality of unit groups, each unit group having a plurality of light emitting diodes (LEDs); and a light mixing layer formed over the unit groups, for mixing lights emitted from the LEDs to provide substantially white light.

In another aspect of the present invention, as embodied, there is also provided a liquid crystal display (LCD) device, comprising: an LCD panel; an optical source having a plurality of unit groups for emitting lights toward the LCD panel, each unit group having a plurality of light emitting diodes (LEDs); and a light mixing layer formed over the unit groups, for mixing the lights emitted from the LEDs to provide substantially white light to the LCD panel.

In another aspect of the present invention, as embodied, there is also provided a method for providing substantially white light for a liquid crystal display device, comprising: providing a plurality of unit groups, each unit group having a plurality of light emitting diodes (LEDs); emitting lights from the LEDs toward a LCD panel; and mixing the lights emitted from the LEDs by a light mixing layer to provide substantially white light to the LCD panel.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

Hereinafter, a backlight unit and a liquid crystal display (LCD) device having the same according to an embodiment of the present invention will be explained in more detail with reference to the attached drawings.

Figure 1:
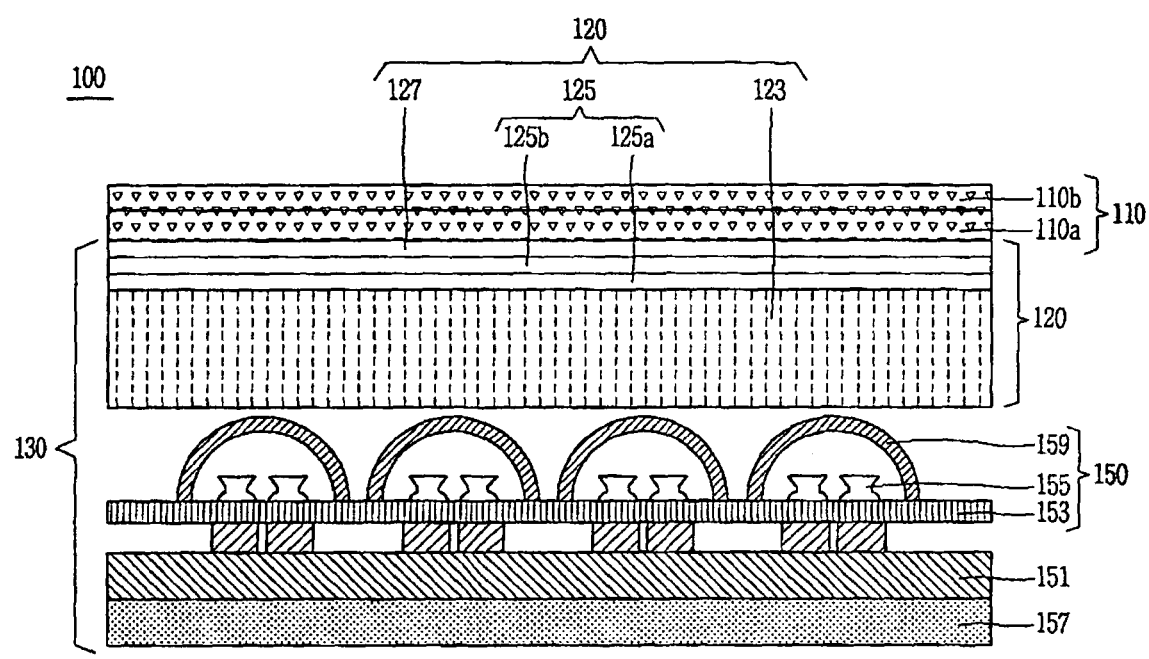
FIG. 1 is a schematic view showing a construction of a liquid crystal display (LCD) device according to an embodiment of the present invention.

FIG. 1 is a schematic view showing a construction of a liquid crystal display (LCD) device according to an embodiment of the present invention. As shown in FIG. 1, an LCD device 100 comprises an LCD panel having a thin film transistor (TFT) array substrate 110a, a color filter substrate 110b, and a liquid crystal layer (not shown) interposed therebetween; and a backlight unit 130 for supplying light to the LCD panel 110.

Although not shown, the TFT array substrate 110a comprises a plurality of gate lines, a plurality of data lines crossing the gate lines thereby implementing pixel regions in a matrix form, and a switching device for switching each of the pixels.

On the color filter substrate 110b, R, G, and B color filter layers are formed at positions corresponding to the pixels. A black matrix for preventing light from being leaked between the color filter layers and for preventing color interference of light that passes through the pixels is formed on the color filter substrate 110b.

A common electrode and a pixel electrode are respectively formed at inner surfaces of the color filter substrate and the TFT array substrate facing each other, thereby applying an electric field to the liquid crystal layer. A voltage applied between the common electrode and the pixel electrode is controlled to change an alignment state of liquid crystal molecules of the liquid crystal layer, thereby individually controlling an optical transmittance of each of the pixels.

The backlight unit 130 comprises a light emitting portion 150 for supplying light to the LCD panel 110, and an optical sheet 120 disposed between the LCD panel 110 and the light emitting portion 150 for enhancing the optical efficiency.

The optical sheet 120 comprises a diffusion plate 123, first and second prism sheets 125a and 125b formed on the diffusion plate 123, and a protection sheet 127 formed on the first and second prism sheets 125a and 125b. The diffusion plate 123 formed on the light emitting portion 150 disperses light incident from the light emitting portion 150, thereby preventing generating bright spots due to a partial light concentration. The diffusion plate 123 also converts a propagating direction of the light that is moving towards the first prism sheet 125a to a vertical direction. The first prism sheet 125a has a flat lower surface and wrinkled surfaces in the front and rear directions, whereas the second prism sheet 125b has a flat lower surface and wrinkled surfaces in the right and left directions. The first prism sheet 125a collects the light moving towards the second prism sheet 125b in the front and rear directions, and the second prism sheet 125b collects the light moving towards the protection sheet 127 in the right and left directions. Therefore, the light moving towards the protection sheet 127 from the diffusion plate 123 is vertical. Accordingly, the light that passes through the first prism sheet 125a and the second prism sheet 125b moves in the vertical direction to be uniformly distributed on an entire surface of the protection sheet 127, thereby increasing the brightness.

The light emitting portion 150 comprises an optical source 155 for generating light, and a light mixing layer 159 for effectively dispersing R, G, and B light emitted from the optical source 155 and thereby mixing the dispersed R, G, and B light together due to the refraction of the light mixing layer 159. The optical source 155 is formed on a metal core printed circuit board (MCPCB), and a reflector 153 for upwardly reflecting light that is downwardly dispersed is provided between the light emitting portion 150 and the MCPCB 151. The reflector 153 is formed of an Al material having excellent reflection characteristics.

The optical source 155 is implemented as an LED, which has better excellent brightness and color reproduction than those of a fluorescent lamp. However, as the brightness of the LED is increased, an inner temperature of the LED is increased. Therefore, the output brightness of the optical source 155 is decreased.

Therefore, a heat emitting plate 157 is provided at the bottom surface of the MCPCB 151. The heat emitting plate 157 receives the heat from the LED and emits it outwardly, thereby preventing the inner temperature of the LED from being increased. That is, as the LED emits the light, the heat is generated in the LED. The generated heat is absorbed by the reflector 153 and then transmitted to the MCPCB 151. Then, the heat is transmitted from the MCPCB 151 to the heat emitting plate 157, and thereafter is outwardly emitted.

Figure 3:
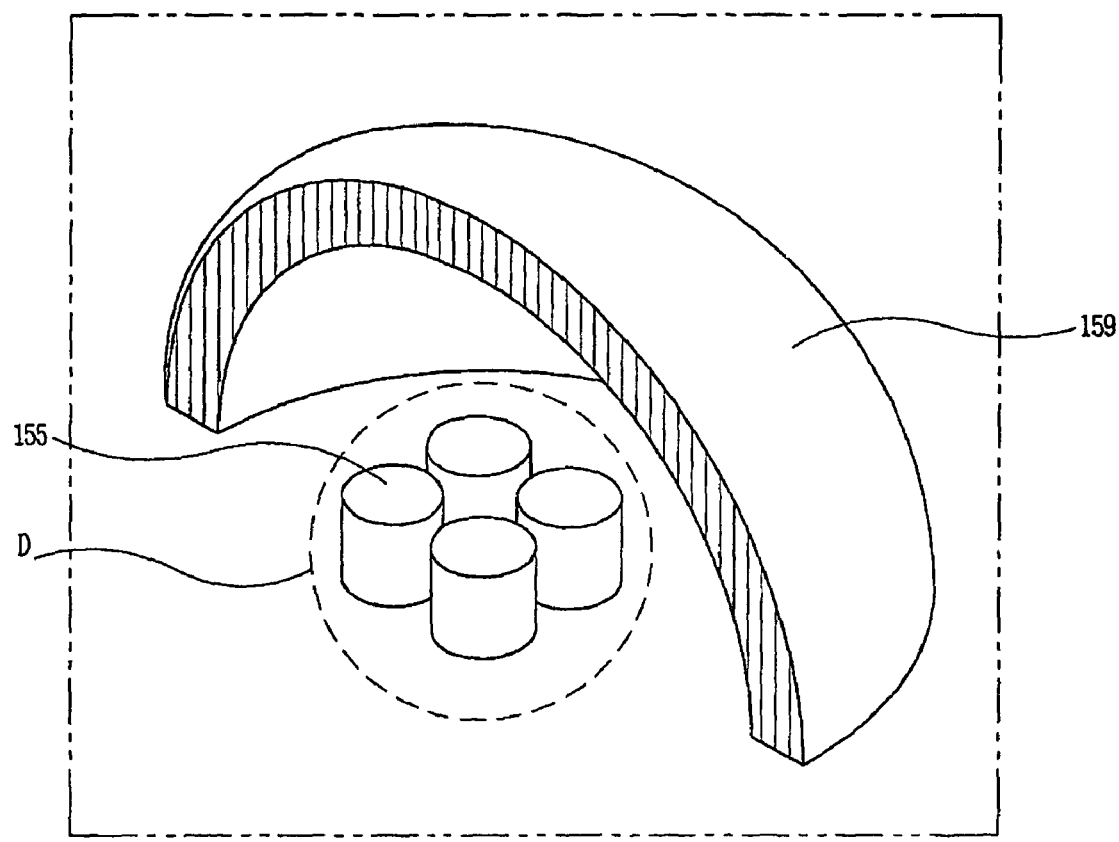
FIG. 3 is an enlarged view showing a unit group of the optical source according to an embodiment of the present invention.

The optical source 155 is implemented as a plurality of LEDs for emitting R, G, and B light constituted as one unit group D (see FIG. 3). A light mixing layer 159 for uniformly mixing R, G, and B light emitted from the corresponding unit group D to generate substantially white light is provided at the optical source 155.

The light mixing layer 159 has a semi-spherical shape so as to disperse R, G, and B light and uniformly mix the dispersed R, G, and B light, thereby generating the white light. That is, the LEDs 155 for emitting R, G, and B light are provided in the light mixing layer 159 having a semi-spherical shape, and the light mixing layer 159 disperses light emitted from the LEDs 155 to outwardly emit it.

Figure 2:
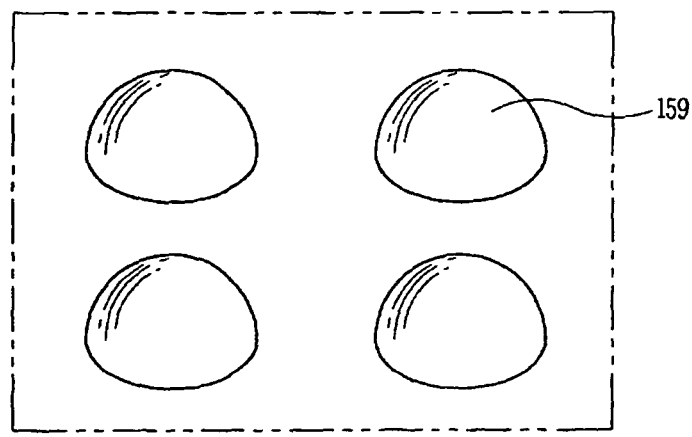
FIG. 2 is a schematic view showing an optical source according to an embodiment of the present invention.

FIG. 2 shows a light mixing layer 159 having a semi-spherical shape, in which the LEDs (not shown) constituting each unit group are capsulated by the light mixing layer 159 and the reflector 153. The light mixing layer 159 covers the LEDs 155 therein, and is fixed onto the MCPCB 151 and in contact with the reflector 153.

FIG. 3 is an enlarged view showing a unit group D of the LEDs 155 inside the light emitting layer 159 according to an embodiment of the present invention. As shown, the LEDs are arranged in a rectangular/square two-by-two matrix form thus to constitute a unit group D inside the light mixing layer 159, thereby effectively mixing R, G, and B light. In an embodiment, the LEDs in each unit group are arranged to be as close as possible to each other. It should be noted that the distance between the adjacent LEDs may vary in order to provide the desired effect of the lights.

The light mixing layer 159 disperses and mixes R, G, and B light emitted from the LEDs, and is formed of a dispersion material of a single-layer or a double-layer structure.

Figure 4:
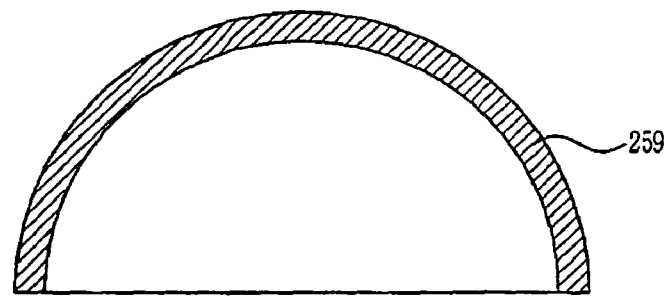
FIG. 4 shows a light mixing layer of a single-layer structure according to an embodiment of the present invention.
Figure 5:
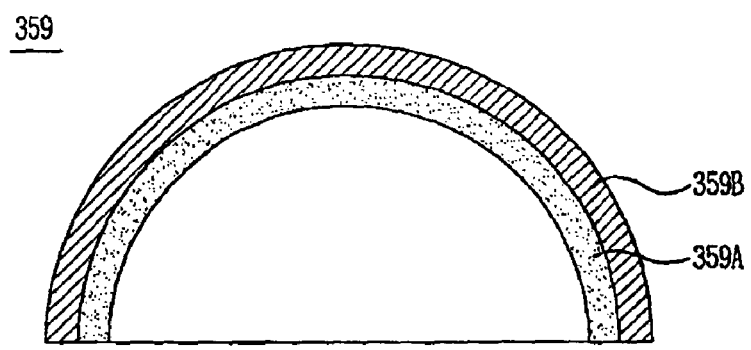
FIG. 5 shows a light mixing layer of a double-layer structure according to an embodiment of the present invention.

FIG. 4 shows a light mixing layer of a single-layer structure according to an embodiment of the present invention, and FIG. 5 shows a light mixing layer of a double-layer structure according to an embodiment of the present invention. As shown in FIG. 4, when a light mixing layer 259 is a single-layer structure, it can be formed of one of poly methyl methcrylate (PMMA), $SK_4$, silica, epoxy, and MgF.

As shown in FIG. 5, when a light mixing layer 359 is a double-layer structure composed of an inner layer 359A and an outer layer 359B, the inner layer 359A can be formed of one of poly methyl methcrylate (PMMA), $SK_4$, silica, epoxy, and MgF, and the outer layer 359B can be formed of one of $SK_4$, silica, and MgF. Herein, the materials of the inner layer 359A and the outer layer 359B are selected so that a refractive index of the inner layer 359A is larger than a refractive index of the outer layer 359B in order to provide excellent color mixture. That is, when the light is incident from the inner layer 359A having a relatively large refractive index to the outer layer 359B having a relatively small refractive index, a total reflection occurs in an incident angle more than a threshold value. When the total reflection occurs in the light mixing layer 359, the color mixture is performed more effectively.

The following table 1 presents each refractive index of PMMA, $SK_4$, silica, epoxy, and MgF that can be a material of the outer layer and the inner layer. Herein, the inner layer and the outer layer can be respectively formed of any of the materials as long as the refractive index of the inner layer is larger than the refractive index of the outer layer.

TABLE 1

| Material | Refractive index |
|---|---|
| $SK_4$ | 1.613 |
| Silica | 1.51 |
| PMMA | 1.49 |
| Epoxy | 1.45 |
| MgF | 1.38 |

In the present invention, since the LEDs are arranged in a rectangular/square two-by-two matrix form rather than in a straight line form, the color uniformity can be more enhanced. Herein, the LEDs can be arranged regardless of the color of the LEDs, and a white LED can be further provided for enhancing the brightness.

Figure 6:
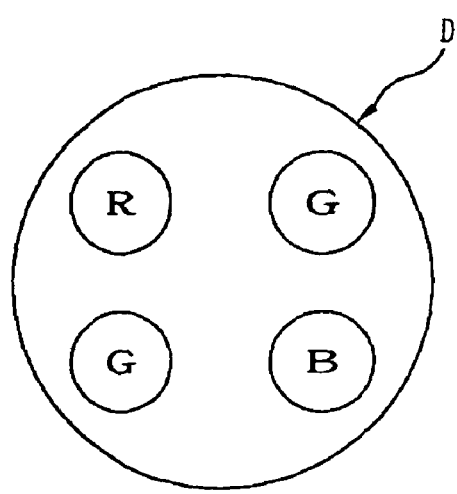
FIGS. 6-8 respectively show different arrangements of an LED according to different embodiments of the present invention.
Figure 7:
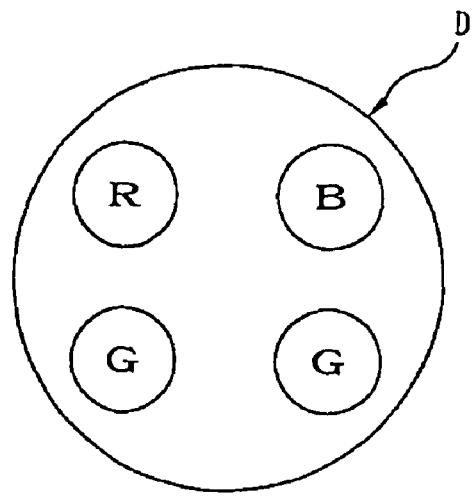
Figure 8:
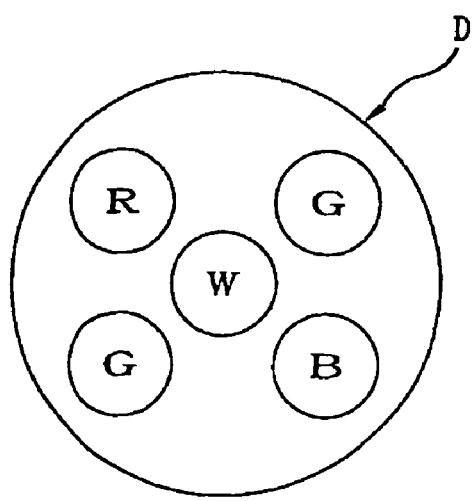

FIGS. 6-8 respectively show different arrangements of the LEDs according to different embodiments of the present invention. As shown in FIGS. 6-8, one unit group is composed of one red LED, one blue LED, and two green LEDs. Herein, the four LEDs (R, 2G, and B) can be arranged in any order as long as they are arranged in a rectangular/square two-by-two matrix form. That is, two green LEDs (G) can be arranged in a diagonal direction as shown in FIG. 6, or the two green LEDs (G) can be arranged to be immediately adjacent to each other as shown in FIG. 7.

As shown in FIG. 8, a white LED (W) can be further provided in the central portion of the rectangular/square two-by-two matrix formed by four LEDs. Using two green LEDs and/or one white LED (W) can enhance the brightness. It is also possible to implement a unit group composed of one red LED, one green LED, and one blue LED. Herein, the three LEDs are arranged in a triangular form, and one white LED can be further provided thereto.

Whereas the conventional LEDs are arranged in a straight line, the illustrated LEDs are arranged in a rectangular/square two-by-two matrix form, a triangular form, etc. in order to improve the color mixture. It should be noted that the LEDs are not limited into the illustrated positions.

Moreover, in the present invention, the light mixing layer for capsulating the LEDs is provided to effectively mix R, G, and B light. The light mixing layer can be formed of any material as long as it has a light dispersion function.

As aforementioned, in the illustrated embodiments, the LEDs for emitting R, G, and B light are implemented as one unit group, and the light mixing layer for covering the LEDs is provided. Accordingly, the color mixture is effectively performed, and the color uniformity and the brightness uniformity are enhanced, thereby providing an LCD device having better picture quality.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A backlight unit, comprising:
   an optical source including a plurality of unit groups, each unit group having a plurality of light emitting diodes (LEDs), wherein each of the unit groups comprises one red (R) LED, one blue (B) LED, and two green (G) LEDs;
   a light mixing layer formed over the unit groups, for mixing lights emitted from the LEDs to provide substantially white light, wherein the light mixing layer is a double-layer structure including an inner layer and an outer layer, and a refractive index of the inner layer is larger than a refractive index of the outer layer to provide color mixture and brightness uniformity by total reflection at a boundary surface between the inner layer and the outer layer of the light mixing layer, and the light mixing layer has a semi-spherical shape to disperse R, G and B light and uniformly mix the dispersed R, G and B light, and is formed of a dispersion material, wherein the mixed dispersed R, G and B light is emitted outwardly through the light mixing layer, and the inner layer is formed of one of poly methyl methcrylate (PMMA), SK4, silica, epoxy and MgF, and the outer layer is formed of one of poly methyl methcrylate (PMMA), SK4, silica, epoxy, and MgF, wherein the inner layer and outer layer are formed of a different material from each other; and
   a reflector disposed under the optical source and the light mixing layer, wherein the LEDs are enclosed by the reflector and the light mixing layer, and each layer of the light mixing layer is in contact with the reflector.

2. The backlight unit of claim 1, wherein the R, B and G LEDs of each of the unit groups are arranged in a matrix form.

3. The backlight unit of claim 1, wherein each of the unit groups further comprises a white LED at a center thereof surrounded by the R, B and G LEDs.

4. The backlight unit of claim 1, wherein the light mixing layer includes a plurality of light mixing layers, each of the light mixing layers covering the LEDs in the corresponding unit group, the LEDs being arranged in a matrix form.

5. The backlight unit of claim 1, further comprising a heat emitting plate below the reflector, a heat generated by the LEDs being absorbed by the reflector and being transmitted from the reflector to the heat emitting plate.

6. The backlight unit of claim 5, further comprising a printed circuit board for driving the LEDs, the printed circuit board being between the reflector and the heat emitting plate, the heat generated by the LEDs being transmitted from the reflector to the heat emitting plate via the printed circuit board.

7. The backlight unit of claim 1, further comprising an optical sheet over the light mixing layer, wherein the optical sheet comprises:
- a diffusion plate for diffusing the substantially white light incident from the optical source;
- a prism sheet above the diffusion plate for increasing frontal brightness of the substantially white light passing through the diffusion plate; and
- a protection sheet attached onto the prism sheet.

8. A liquid crystal display (LCD) device, comprising:
an LCD panel;
an optical source having a plurality of unit groups for emitting lights toward the LCD panel, each unit group having a plurality of light emitting diodes (LEDs), wherein each of the unit groups comprises one red (R) LED, one blue (B) LED, and two green (G) LEDs;
a light mixing layer formed over the unit groups, for mixing the lights emitted from the LEDs to provide substantially white light to the LCD panel, wherein the light mixing layer is a double-layer structure including an inner layer and an outer layer, and a refractive index of the inner layer is larger than a refractive index of the outer layer to provide color mixture and brightness uniformity by total reflection at a boundary surface between the inner layer and the outer layer of the light mixing layer, and the light mixing layer has a semi-spherical shape to disperse R, G and B light and uniformly mix the dispersed R, G and B light, and is formed of a dispersion material, wherein the mixed dispersed R, G and B light is emitted outwardly through the light mixing layer, and the inner layer is formed of one of poly methyl methcrylate (PMMA), SK4, silica, epoxy and MgF, and the outer layer is formed of one of poly methyl methcrylate (PMMA), SK4, silica, epoxy, and MgF, wherein the inner layer and outer layer are formed of a different material from each other; and
a reflector disposed under the optical source and the light mixing layer, wherein the LEDs are enclosed by the reflector and the light mixing layer, and each layer of the light mixing layer is in contact with the reflector.

9. The LCD device of claim 8, wherein the R, B and G LEDs of each of the unit groups are arranged in a matrix form.

10. The LCD device of claim 8, wherein each of the unit groups further comprises a white LED at a center thereof surrounded by the R, B and G LEDs.

11. The LCD device of claim 8, wherein the light mixing layer includes a plurality of light mixing layers, each of the light mixing layers covering the LEDs in the corresponding unit group, the LEDs being arranged in a matrix form.

12. The LCD device of claim 8, further comprising a heat emitting plate below the reflector, a heat generated by the LEDs being absorbed by the reflector and being transmitted from the reflector to the heat emitting plate.

13. The LCD device of claim 12, further comprising a printed circuit board for driving the LEDs, the printed circuit board being between the reflector and the heat emitting plate, the heat generated by the LEDs being transmitted from the reflector to the heat emitting plate via the printed circuit board.

14. The LCD device of claim 8, further comprising an optical sheet located between the LCD panel and the light mixing layer, wherein the optical sheet comprises:
- a diffusion plate for diffusing the substantially white light incident from the optical source;
- a prism sheet above the diffusion plate for increasing frontal brightness of the white light passing through the diffusion plate; and
- a protection sheet attached onto the prism sheet.

15. A method for providing substantially white light for a liquid crystal display device, the method comprising:
providing a plurality of unit groups, each unit group having a plurality of light emitting diodes (LEDs), wherein the step of providing the plurality of unit groups includes providing one red (R) LED, one blue (B) LED, and two green (G) LEDs in each of the unit groups and arranging the R, B, G LEDs in a matrix form;
forming a light mixing layer to be a double-layer structure including an inner layer and an outer layer, and a refractive index of the inner layer being larger than a refractive index of the outer layer to provide color mixture and brightness uniformity by total reflection at a boundary surface between the inner layer and the outer layer of the light mixing layer, and the light mixing layer has a semi-spherical shape to disperse R, G and B light and uniformly mix the dispersed R, G and B light, and is formed of a dispersion material, wherein the mixed dispersed R, G and B light is emitted outwardly through the light mixing layer, and the inner layer is formed of one of poly methyl methcrylate (PMMA), SK4, silica, epoxy and MgF, and the outer layer is formed of one of poly methyl methcrylate (PMMA), SK4, silica, epoxy, and MgF, wherein the inner layer and outer layer are formed of a different material from each other;
emitting lights from the LEDs toward a LCD panel; and
mixing the lights emitted from the LEDs by the light mixing layer to provide substantially white light to the LCD panel, wherein the step of mixing the lights includes covering the LEDs arranged in a matrix form in the corresponding unit group by the corresponding light mixing layer; and mixing the lights emitted from the LEDs in the corresponding unit group by the light mixing layer.

16. The method of claim 15, further comprising providing a white LED at a center of the unit group to be surrounded by the R, B and G LEDs.

17. The method of claim 15, further comprising:
absorbing a heat generated by the LEDs by a reflector that is in contact with the light mixing layers; and
dissipating the heat absorbed by the reflector from the reflector to a heat emitting plate below the reflector.

* * * * *